US012025302B1

(12) United States Patent
Edwards

(10) Patent No.: US 12,025,302 B1
(45) Date of Patent: Jul. 2, 2024

(54) LIGHT EMITTING DIODE LIGHTING SYSTEMS AND METHODS

(71) Applicant: NBCUniversal Media, LLC, New York, NY (US)

(72) Inventor: Charles Edwards, Mesa, AZ (US)

(73) Assignee: NBCUniversal Studios LLC, New York, NY (US)

(*) Notice: Subject to any disclaimer, the term of this patent is extended or adjusted under 35 U.S.C. 154(b) by 0 days.

(21) Appl. No.: 18/141,256

(22) Filed: Apr. 28, 2023

(51) Int. Cl.

| | |
|---|---|
| ***F21V 29/56*** | (2015.01) |
| ***F21V 29/503*** | (2015.01) |
| ***F21V 29/58*** | (2015.01) |
| ***H05B 45/20*** | (2020.01) |
| *F21Y 115/10* | (2016.01) |

(52) U.S. Cl.
CPC ............ *F21V 29/59* (2015.01); *F21V 29/503* (2015.01); *H05B 45/20* (2020.01); *F21Y 2115/10* (2016.08)

(58) Field of Classification Search
CPC ....... F21V 29/59; F21V 29/503; H05B 45/20; F21Y 2115/10
See application file for complete search history.

(56) References Cited

U.S. PATENT DOCUMENTS

| | | | |
|---|---|---|---|
| 6,072,280 A | 6/2000 | Allen | |
| 6,160,359 A | 12/2000 | Fleischmann | |
| 8,033,677 B1 | 10/2011 | Olsson et al. | |
| 8,193,553 B2 | 6/2012 | Chen | |
| 8,436,517 B2 | 5/2013 | Oki | |
| 8,651,704 B1 * | 2/2014 | Gordin | F21V 29/60 362/373 |
| 9,310,031 B2 | 4/2016 | Su et al. | |
| 9,723,680 B2 | 8/2017 | Pope et al. | |
| 9,752,738 B2 | 9/2017 | Baxter et al. | |
| 9,930,742 B1 | 3/2018 | Sooch et al. | |
| 9,930,763 B1 | 3/2018 | Trickler et al. | |
| 10,111,275 B2 | 10/2018 | Norton et al. | |
| 10,174,890 B2 | 1/2019 | Di Trapani et al. | |
| 10,361,337 B2 | 7/2019 | Ahmed et al. | |
| 10,609,782 B2 | 3/2020 | Zaderej et al. | |
| 10,611,332 B2 | 4/2020 | Tylutki et al. | |
| 10,768,677 B2 | 9/2020 | Lin et al. | |
| 10,788,611 B2 | 9/2020 | Muschaweck | |
| 11,047,560 B2 | 6/2021 | Edwards | |

(Continued)

FOREIGN PATENT DOCUMENTS

| | | |
|---|---|---|
| DE | 102006016529 A1 | 10/2007 |
| DE | 102011083698 A1 | 4/2013 |

(Continued)

OTHER PUBLICATIONS

Extended European Search Report for Appl. No. 191687391.1 dated Jun. 27, 2019 (8 pages).

(Continued)

*Primary Examiner* — Elmito Breval
(74) *Attorney, Agent, or Firm* — Fletcher Yoder, P.C.

(57) ABSTRACT

A lighting assembly includes a chassis and an interface. The interface is configured to allow fluid to pass through the chassis to a light emitting diode (LED) assembly when the LED assembly is installed at the interface. Additionally, the interface is configured to prevent the fluid from exiting the chassis when the LED assembly is not installed at the interface.

23 Claims, 12 Drawing Sheets
(1 of 12 Drawing Sheet(s) Filed in Color)

(56) References Cited

U.S. PATENT DOCUMENTS

| | | | |
|---|---|---|---|
| 11,333,342 | B2 | 5/2022 | Edwards |
| 2003/0227774 | A1 | 12/2003 | Martin et al. |
| 2006/0001384 | A1 | 1/2006 | Tain et al. |
| 2006/0076908 | A1 | 4/2006 | Morgan et al. |
| 2009/0201374 | A1 | 8/2009 | Hung et al. |
| 2009/0218072 | A1 | 9/2009 | Eriksen et al. |
| 2009/0243493 | A1 | 10/2009 | Bergquist |
| 2010/0097798 | A1 | 4/2010 | Young |
| 2011/0051409 | A1 | 3/2011 | Nearman |
| 2011/0075431 | A1 | 3/2011 | Wu |
| 2012/0206050 | A1 | 8/2012 | Spero |
| 2013/0170176 | A1 | 7/2013 | Athalye |
| 2013/0176723 | A1 | 7/2013 | Yang et al. |
| 2013/0214676 | A1 | 8/2013 | Li et al. |
| 2013/0214698 | A1 | 8/2013 | Aliakseyeu et al. |
| 2014/0103373 | A1 | 4/2014 | Li et al. |
| 2014/0168976 | A1 | 6/2014 | Oki |
| 2014/0198480 | A1 | 7/2014 | Dai et al. |
| 2014/0211467 | A1 | 7/2014 | Yang et al. |
| 2014/0218892 | A1 | 8/2014 | Edwards |
| 2014/0264420 | A1 | 9/2014 | Edwards et al. |
| 2014/0306599 | A1 | 10/2014 | Edwards et al. |
| 2015/0000877 | A1 | 1/2015 | Yang |
| 2015/0085466 | A1 | 3/2015 | Edwards |
| 2015/0092404 | A1 | 4/2015 | Kim et al. |
| 2015/0233558 | A1 | 8/2015 | Ticktin et al. |
| 2016/0186979 | A1 | 6/2016 | Arik et al. |
| 2017/0167712 | A1 | 6/2017 | Melzner |
| 2017/0254518 | A1 | 9/2017 | Vasylyev |
| 2017/0354022 | A1 | 12/2017 | Dimberg et al. |
| 2018/0073686 | A1 | 3/2018 | Quilici et al. |
| 2018/0295785 | A1 | 10/2018 | Ross |
| 2018/0306412 | A1 | 10/2018 | Halliwell |
| 2018/0352629 | A1 | 12/2018 | Crosbie et al. |
| 2022/0268433 | A1 | 8/2022 | Edwards |

FOREIGN PATENT DOCUMENTS

| | | | |
|---|---|---|---|
| EP | 3208515 | A1 | 8/2017 |
| WO | 2015060475 | A1 | 4/2015 |
| WO | 2016115299 | A1 | 7/2016 |

OTHER PUBLICATIONS

Extended European Search Report for Appl. No. 20172203.0 dated Oct. 15, 2020 (11 pages).

* cited by examiner

LIGHT EMITTING DIODE LIGHTING SYSTEMS AND METHODS

BACKGROUND

The present disclosure relates generally to light systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, liquid-cooled LED tower lamps are designed and integrated with housing components such as a coolant base, a controller, lenses/optical accessories, and plumbing and electrical connections. However, the LED tower lamps and housing components may be integrated in a manner that may make removal of the LED tower lamps from the housing components cumbersome and/or may require drainage of coolant from the LED lamp. Additionally, the housing components may be specific to the particular type of LED tower lamp, thereby meaning different housings may be utilized for different types of LED tower lamps. As such, if the liquid-cooled LED tower lamp requires maintenance or replacement and/or if a different LED tower lamp with a different lighting function is desired, the entire lighting fixture (e.g., the LED tower lamp and the housing components) may be replaced, which can be time-consuming and costly.

Furthermore, a limiting factor in LED fixture design is the size and number of LEDs required. For example, designs for Correlated Color Temperature (CCT) tunable white light LED fixtures may use two color channels (e.g., a 2700K channel and a 6500K channel.) The various blending (e.g., ratios) between these two color channels make up the range of CCTs available to be produced by the fixture. However, at each end of the CCT range, it may be the case that only half of the total LEDs of the fixture are used. For example, for 2700K light, one half of the LEDs may emit light, while the other half of the LEDs do not emit light. At CCTs that are more typically used for production (e.g., 3200K and 5600K) all of one channel (e.g., half of the total LEDs of the fixture) may be used, while a small portion of the other channel is used for tuning. Indeed, all of the LEDs may not be utilized unless the CCT values that are approximately in the center of the range (e.g., approximately 4300K), which may occur when all of the LEDs of both the 2700K channel and the 6500K are used. As such, current design limits overall power output of the LED fixture at desired CCTs for production (e.g., approximately 3200K and 5600K).

BRIEF DESCRIPTION

In one embodiment, a lighting assembly includes a chassis and an interface. The interface is configured to allow fluid to pass through the chassis to a light emitting diode (LED) assembly when the LED assembly is installed at the interface. Additionally, the interface is configured to prevent the fluid from exiting the chassis when the LED assembly is not installed at the interface.

In another embodiment, a lighting assembly includes a light emitting diode (LED) assembly that includes a plurality of LEDs. The light assembly also includes a chassis that includes a controller communicatively coupled to the LED assembly. The controller is configured to control emission of light by the plurality of LEDs. The chassis also includes an interface that is configured to allow fluid to pass through the chassis to the LED assembly when the LED assembly is installed at the interface. The interface is also configured to prevent the fluid from exiting the chassis when the LED assembly is not installed at the interface.

In yet another embodiment, lighting assembly includes a light emitting diode (LED) assembly that includes a plurality of LEDs. The lighting assembly also includes a controller communicatively coupled to the LED assembly. The controller is configured to determine a type of the LED assembly and control emission of light by the plurality of LEDs based on the type of the LED assembly.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings. The patent or application file contains at least one drawing executed in color. Copies of this patent or patent application publication with color drawing(s) will be provided by the Office upon request and payment of the necessary fee.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
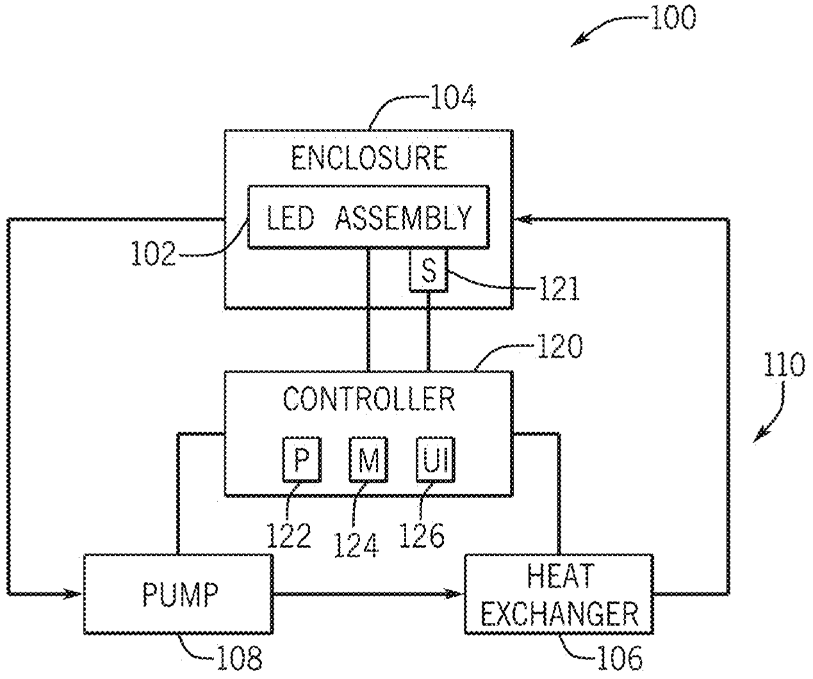
FIG. 1 is a schematic diagram of an embodiment of a cooling system configured to immersively and actively cool a light emitting diode (LED) assembly, in accordance with one or more embodiments of the present disclosure.

Turning now to the drawings, FIG. 1 is a schematic diagram of a cooling system 100 configured to actively cool an LED assembly 102. The cooling system 100 includes an enclosure 104 configured to at least partially enclose and/or house the LED assembly 102 and a heat exchanger 106 fluidly coupled to the enclosure 104. The cooling system 100 also includes a pump 108 configured to circulate fluid (e.g., coolant, mineral oil, water, a hydrocarbon fluid, a silicon fluid, or a combination thereof) along a cooling circuit 110 through the heat exchanger 106, through the enclosure 104, through and/or over the LED assembly 102, and back to the pump 108. In certain embodiments, the cooling system 100 may include the LED assembly 102 or a portion thereof.

The LED assembly 102 may be any assembly including one or more LEDs. For example, to provide lighting for applications such as television and theater sets, film sets, tradeshows, and any one of the range of permanent, semi-permanent, and temporary settings, the LED assembly 102 may include multiple LEDs configured to emit light. While emitting light, the LEDs may produce heat and a temperature of a surrounding area (e.g., an area adjacent to the LED assembly 102 and/or within/adjacent to the enclosure 104) may generally increase.

During operation, the cooling system 100 is configured to absorb the heat generated by the LED assembly 102 and to transfer the heat to ambient air. For example, as the pump 108 circulates the fluid through the enclosure 104 and/or through the LED assembly 102, the fluid may absorb the heat generated by the LED assembly 102. The heat exchanger 106 may include a radiator and/or fan(s) configured to actively draw ambient air toward/across the heat exchanger 106 to cool the fluid traveling through the heat exchanger 106 and along the cooling circuit 110. In certain embodiments, the heat exchanger 106 may include a second fluid (e.g., in addition to or in place of the ambient air) configured to exchange heat with the fluid flowing along the cooling circuit 110.

The pump 108 may be a variable speed pump configured to circulate the fluid through the cooling circuit 110. In certain embodiments, a housing of the pump 108 may include a flexible diaphragm configured to expand and/or retract based on a volume of the fluid flowing along the cooling circuit 110. For example, as the fluid absorbs heat at and from the LED assembly 102, the fluid may expand (e.g., thermal expansion). As the fluid flows from the LED assembly 102 and the enclosure 104, the flexible diaphragm of the pump 108 may expand to allow of the increased volume of fluid to pass through the pump without affecting the flowrate of the fluid through the pump 108 and along the cooling circuit 110. In some embodiments, the flexible diaphragm of the pump 108 may be a service panel configured to allow access to internal portions of the pump 108. As described in greater detail below, in certain embodiments, the flexible diaphragm may be located elsewhere along the cooling circuit 110 (e.g., in addition to or in place of be located at the pump 108) to facilitate thermal expansion of the fluid in the cooling circuit 110.

The LED assembly 102 is configured to emit light, which may pass through the fluid circulating between the LED assembly 102 and the enclosure 104 and through the enclosure 104. As such, the LED assembly 102 is configured to provide lighting for the various applications described herein (e.g., motion picture and television lighting and other applications that may benefit from high intensity lighting) while being cooled by the cooling system 100. The LEDs of the LED assembly 102 may include varied/multiple configurations. For example, the LED assembly 102 may include chip scale packaging (CSP) arrays (e.g., bi-color CSP arrays). CSP technology may benefit from very high density of LED chips in a specified area (e.g., per square inch/centimeter), and CSP technology may utilize different colors of individual LEDs. For example, CSP technology may include a five color configuration (e.g., warm white, cool white, red, green, and blue), a four color configuration (e.g., white, red, green, and blue), a three color configuration (e.g., red, green, and blue), a bi-color white configuration (e.g., warm white and cool white), a single white configuration, and/or a single color configuration.

In some embodiments, the LED assembly 102 may include single color chip on board ("COB") arrays. The COB arrays may include a relatively large number of LEDs bonded to a single substrate and a layer of phosphor placed over the entire array. An advantage of COB technology is very high LED density per specified area (e.g., per square inch/centimeter). Additionally or alternatively, the LED assembly 102 may include discrete LEDs.

The cooling system 100 includes a controller 120 configured to control the LED assembly 102, the heat exchanger 106, the pump 108, or a combination thereof. For example, the controller 120 may control some or all LEDs of the LED assembly 102 to cause the LEDs to emit light. Additionally or alternatively, the controller 120 may control operation of the heat exchanger 106 to cause the heat exchanger 106 to exchange more or less heat between the fluid and the ambient air. For example, the controller 120 may control fans of the heat exchanger 106 to control an air flow rate through/over the heat exchanger 106. In certain embodiments, the fans of the heat exchanger 106 may be controlled via pulse width modulated (PWM) power. The fans may be controlled based on the temperature at the LED assembly 102. In some embodiments, to reduce a noise output of the fans of the heat exchanger 106, the controller 120 may operate the fans only when cooling of the fluid by other means (e.g., via the radiator without active airflow) is insufficient.

As illustrated, the cooling system 100 may include a sensor 121 disposed at the LED assembly 102 and configured to output a signal (e.g., an input signal) indicative of the temperature at the LED assembly 102 and/or a temperature of the fluid adjacent to the LED assembly 102. The sensor 121 may be any suitable temperature/thermal sensor, such as a thermocouple. In certain embodiments, the cooling system 100 may include other thermal sensor(s) disposed within the fluid and configured to output a signal indicative of a temperature of the fluid (e.g., within the enclosure 104) and/or disposed at the enclosure 104 and configured to output a signal indicative of a temperature at the enclosure 104.

Further, the controller 120 may control operation of the pump 108 to cause the pump 108 to circulate the fluid along the cooling circuit 110 at particular flowrates. For example, based on the temperature at the LED assembly 102 and/or at the enclosure 104 (e.g., based on the signal indicative of the temperature at the LED assembly 102 received from the sensor 121), the controller 120 may be configured to output a signal (e.g., an output signal) to the pump 108 indicative of instructions to adjust the flowrate of the fluid flowing through the cooling circuit 110.

As illustrated, the controller 120 includes a processor 122 and a memory 124. The processor 122 (e.g., a microprocessor) may be used to execute software, such as software stored in the memory 124 for controlling the cooling system 100 (e.g., for controller operation of the pump 108 to control the flowrate of fluid through the cooling circuit 110). Moreover, the processor 122 may include multiple microprocessors, one or more "general-purpose" microprocessors, one or more special-purpose microprocessors, and/or one or more application specific integrated circuits (ASICS), or some combination thereof. For example, the processor 122 may include one or more reduced instruction set (RISC) or complex instruction set (CISC) processors.

The memory device 124 may include a volatile memory, such as random-access memory (RAM), and/or a nonvolatile memory, such as read-only memory (ROM). The memory device 124 may store a variety of information and may be used for various purposes. For example, the memory device 124 may store processor-executable instructions (e.g., firmware or software) for the processor 122 to execute, such as instructions for controlling the cooling system 100. In certain embodiments, the controller 120 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data (e.g., measured temperatures at the LED assembly 102), instructions (e.g., software or firmware for controlling the cooling system 100), and any other suitable data. The processor 122 and/or the memory device 124, and/or an additional processor and/or memory device, may be located in any suitable portion of the system. For example, a memory device for storing instructions (e.g., software or firmware for controlling portions of the cooling system 100) may be located in or associated with the cooling system 100.

Additionally, the controller 120 includes a user interface 126 configured to inform an operator of the temperature at the LED assembly 102 and/or of the flowrate of the fluid through the cooling circuit 110. For example, the user interface 126 may include a display and/or other user interaction devices (e.g., buttons) configured to enable operator interactions.

Figure 2:
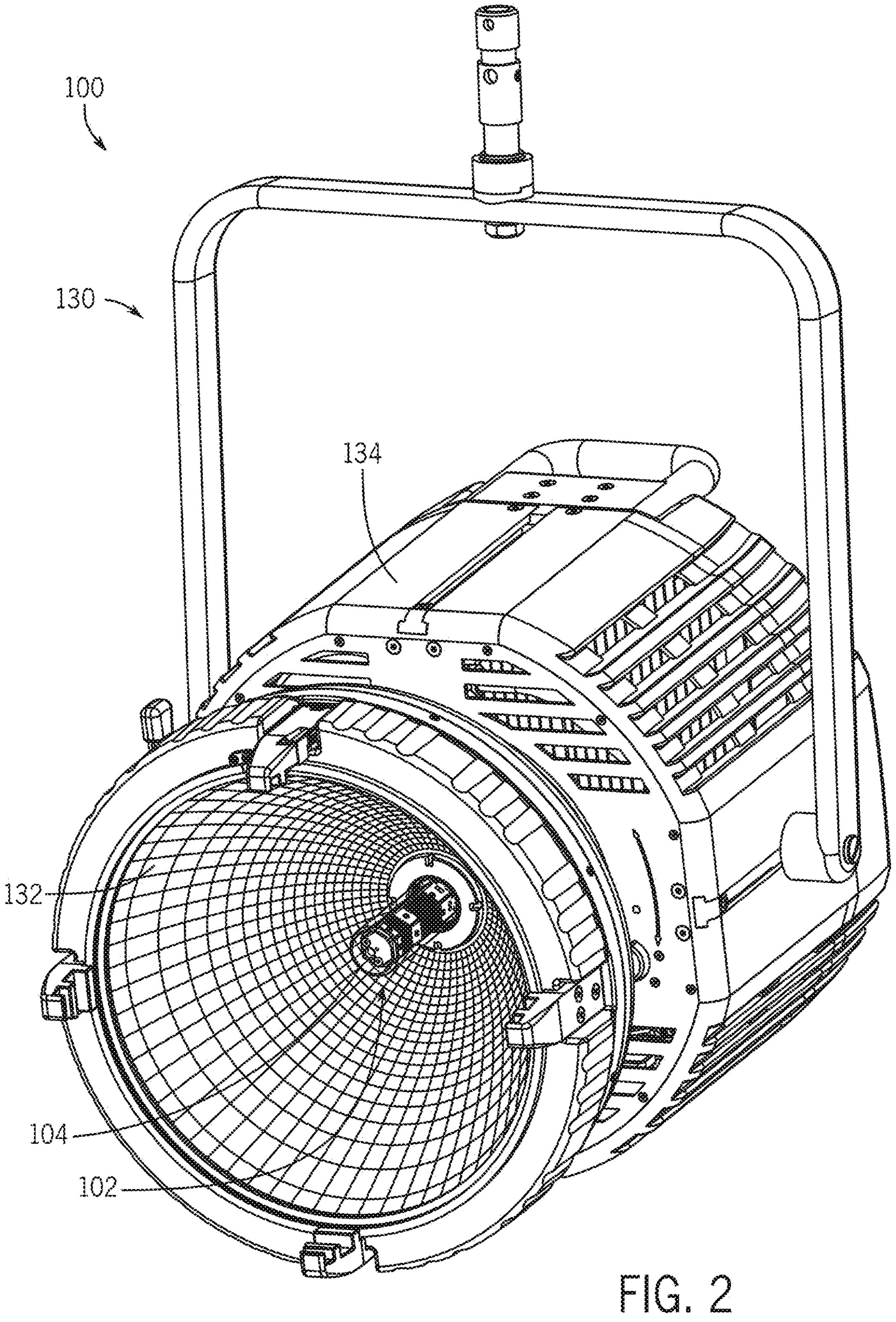
FIG. 2 is a perspective view of an embodiment of a lighting assembly having the LED assembly and the cooling system of FIG. 1, in accordance with one or more embodiments of the present disclosure.

FIG. 2 is a perspective view of an embodiment of a lighting assembly 130 having the cooling system 100 and the LED assembly 102 of FIG. 1. The lighting assembly 130 includes a reflector 132 (e.g., a parabolic reflector) configured to reflect light emitted by the LED assembly 102. For example, the light emitted by the LED assembly 102 may pass through the fluid disposed between the LED assembly 102 and the enclosure 104, through the enclosure 104, and may be reflected by the reflector 132 outwardly. The reflector 132 is coupled to a chassis 134 (e.g., a housing) of the lighting assembly 130. In certain embodiments, the LED assembly 102, the enclosure 104, and/or other portions of the cooling system 100 may be coupled to the chassis 134.

Figure 3:
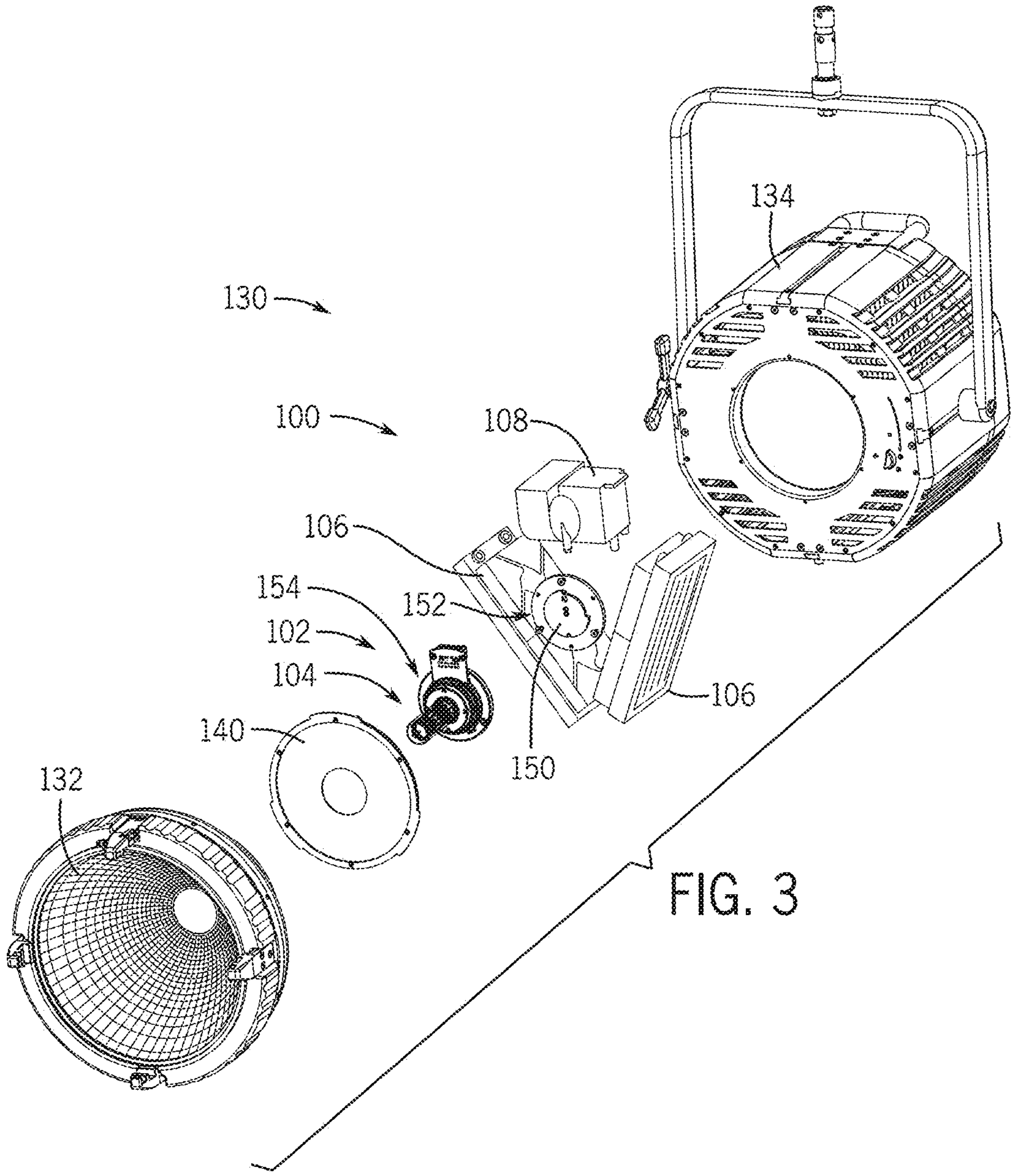
FIG. 3 is an exploded perspective view of the lighting assembly of FIG. 2 having the cooling system and LED assembly of FIG. 2, in accordance with one or more embodiments of the present disclosure.

For example, FIG. 3 is an exploded perspective view of the lighting assembly 130 of FIG. 2 having the cooling system 100. As illustrated, the cooling system 100 includes the enclosure 104, the LED assembly 102 disposed in the enclosure 104, the heat exchanger 106 configured to exchange heat with the fluid, and the pump 108 configured to drive circulation of the fluid. The lighting assembly 130 may also include a plate 140 that may interface with the reflector 132 to attach the reflector to the chassis 134.

The lighting assembly 130 may be modular, allowing the LED assembly 102 to be replaced with other LED assemblies as well as the reflector 132 to be replaced with other reflectors or optic accessories. In particular, exchanging or replacing the LED assembly 102 (and enclosure 104) may be done in a manner that allows the lighting assembly 130 to maintain coolant. That is, the LED assembly 102 and reflector 132 may be replaced without drainage of the coolant from the cooling system 100. In addition, various different types of LED assemblies (e.g., LED tower lamps) and/or optic accessors can be supported and used with a single main base (e.g., chassis 134) and controller (e.g., controller 120, which may be included inside of or attach to the chassis 134).

In particular, the chassis 134 of the lighting assembly 130 may include a valve plate 150 that may be fluidly coupled to the pump 108 and the LED assembly 102 to enable the exchange of coolant between the LED assembly 102 and the pump 108. The valve plate 150 may be included in an interface assembly 152 of the chassis 134. In particular, and as discussed below in greater detail, the LED assembly 102 may include a valve plate 154 that physically couples to the valve plate 150 of the chassis 134 and that may be held in place (e.g., axially) by the interface assembly 152. More specifically, the valve plate 150 and the valve plate 154 may interlock with one another, and, after the LED assembly 102 has been coupled to the chassis 134, the valve plate 150 and the valve plate 154 may be rotated (e.g., by rotating the LED assembly 102) to enable coolant to flow from the chassis 134 (e.g., via the pump 108) to LED assembly 102 as well as to hold the LED assembly 102 in place (e.g., within the interface assembly 152).

Figure 4:
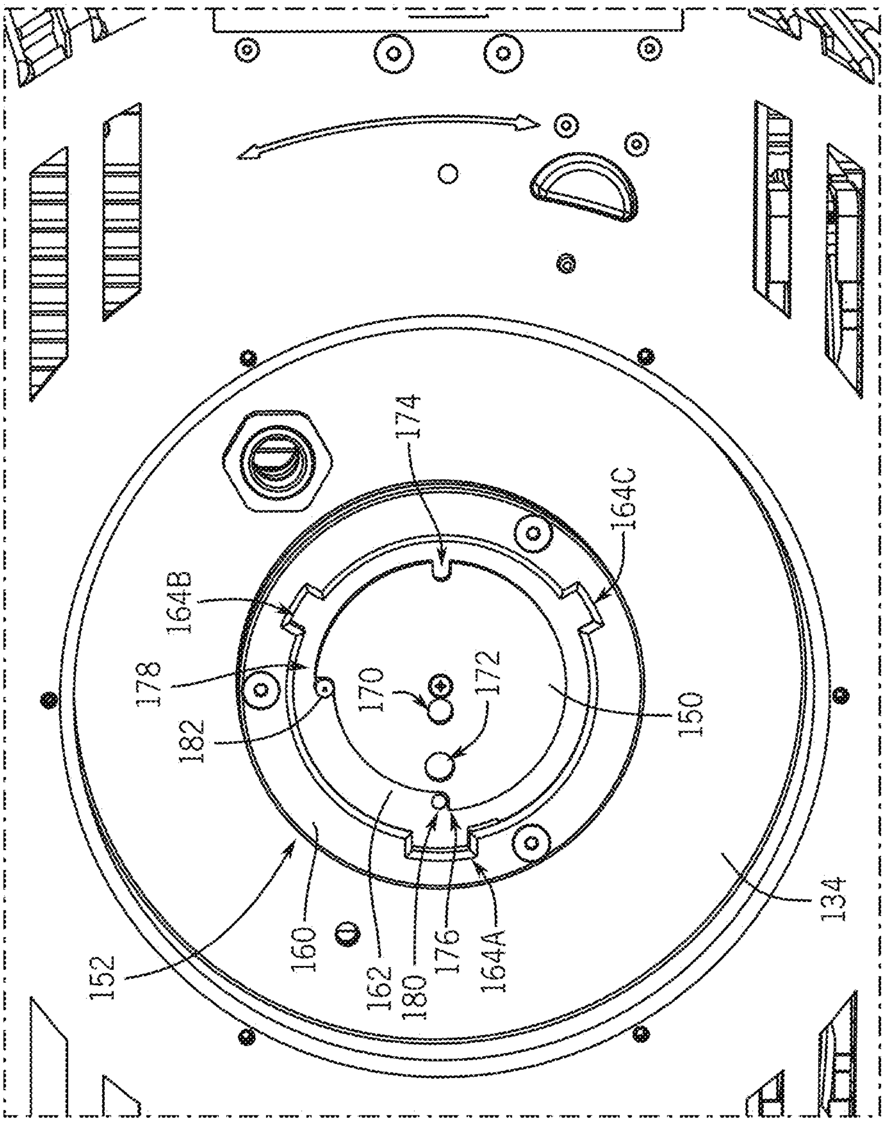
FIG. 4 is a top perspective view of the interface assembly of the chassis of FIG. 2 and FIG. 3, in accordance with one or more embodiments of the present disclosure.
Figure 5:
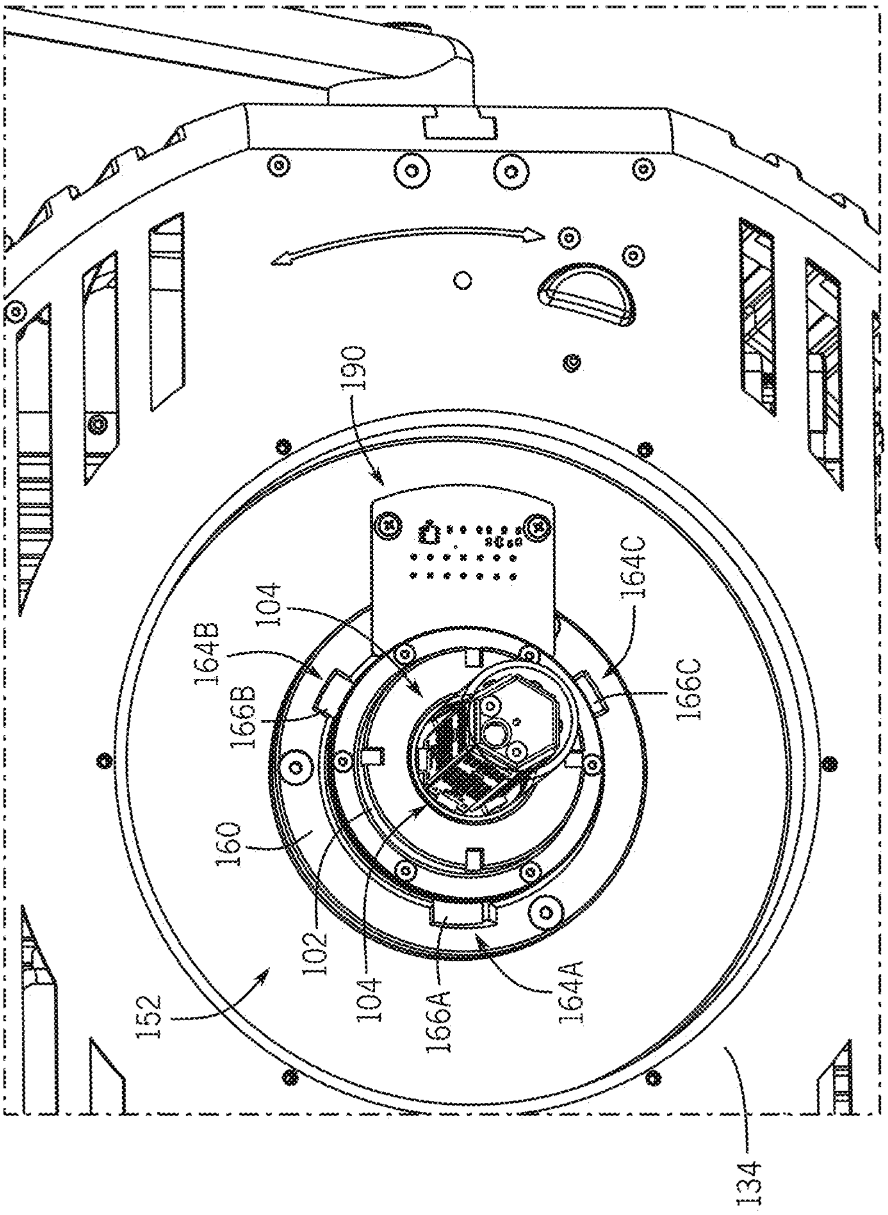
FIG. 5 is a top perspective view of the interface assembly of FIG. 4 with the LED assembly of FIG. 3 placed inside the interface assembly in a closed position, in accordance with one or more embodiments of the present disclosure.
Figure 6:
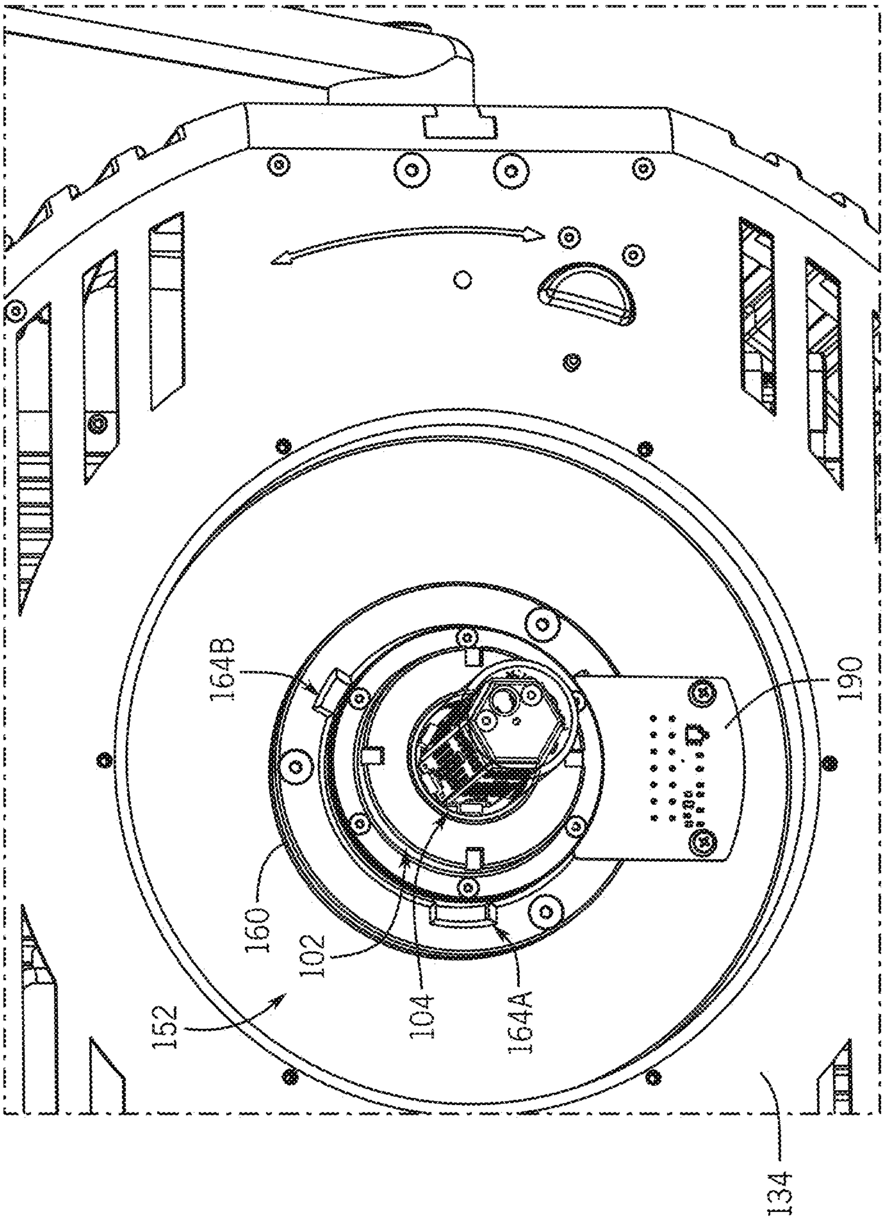
FIG. 6 is a top perspective view of the interface assembly of FIG. 4 with the LED assembly of FIG. 3 placed inside the interface assembly in an open position, in accordance with one or more embodiments of the present disclosure.

Continuing with the drawings, FIG. 4 is a top perspective view of the interface assembly 152 of the chassis 134. The interface assembly 152, which may be referred to as an "interface," may include an outer ring 160 that extends axially from the chassis 134, a base plate 162 partially disposed underneath the outer ring 160, and the valve plate 150. The outer ring 160 includes slots 164 (referring collectively to slot 164A, slot 164B, and slot 164C) which may receive portions of the LED assembly 102. Referring briefly to FIG. 5, which is a top perspective view of the interface assembly 152 with the LED assembly 102 placed inside the interface assembly 152 in a "closed" position, the slot 164A (or any of the slots) may have a different size than the slots 164B and/or the slot 164C to better enable users installing the LED assembly 102 to properly align tabs 166 (referring collectively to tab 166A, tab 166B, and tab 166C, which may have sizes corresponding to the slots 164) of the LED assembly 102 within the slots 164 of the interface assembly 152 to properly install the LED assembly 102. In the closed position, the LED assembly 102 may be removed from the interface assembly 152 or rotated to place the LED assembly 102 in an "open" position, as shown in FIG. 6. In the open position, coolant can flow from the chassis 134 into the LED assembly 102. In other words, in the closed position, coolant may not flow into the LED assembly 102. Additionally, when switched from the open position to the closed position, coolant may be trapped within the LED assembly 102 and the chassis 134, thereby preventing coolant from leaking when replacing the LED assembly 102. Gaskets or other sealing devices (e.g., O-rings) may also be included in the interface assembly 152 or chassis 134 to aid in preventing coolant leaks.

Referring to FIG. 4 and FIG. 5, the base plate 162 may have openings (e.g., a coolant inlet and a coolant outlet) that remain covered (and sealed) by the valve plate 150 when the valve plate 150 is in a closed position, such as illustrated in FIG. 4. The valve plate 150, as illustrated, includes an opening 170, an opening 172, a groove 174, a notch 176, and a notch 178. When the LED tower 102 is placed in the interface assembly 152 and rotated to the open position, the rotation of the LED tower 102 causes the valve plate 150 to rotate to the open position. For example, as discussed below, the LED tower 102 may be rotated (e.g., an approximately ninety-degree clockwise rotation) to cause the valve plate 150 to rotate (e.g., the same amount of rotation), enabling the opening 170 and opening 172 to align with openings in the base plate 162 to enable the flow of coolant into the LED tower 102 and from the LED tower 102 into the chassis 134. The valve plate 154 of the LED tower 102 may include a protrusion that extends from the valve plate 154 into the groove 174 that causes the valve plate 150 to rotate when the LED tower 102 is rotated. The notch 176 may rest against a depressible protrusion (that may be located at the area indicated by arrow 180) of the base plate 162 that may be depressed when the LED tower 102 is placed within the interface assembly 152. In some embodiments, the depressible protrusion may be spring-loaded. The depressible protrusion of the base plate 162 may prevent (clockwise) rotation of the valve plate 150 until depressed beneath (e.g., partially or wholly within) the base plate 162. Somewhat similarly, the notch 178 may rest against a protrusion 182 of the base plate 162, which may prevent counterclockwise rotation of the base plate 162 (e.g., so that the valve plate 150 cannot be rotated further counterclockwise than the closed position shown in FIG. 4).

Figure 8:
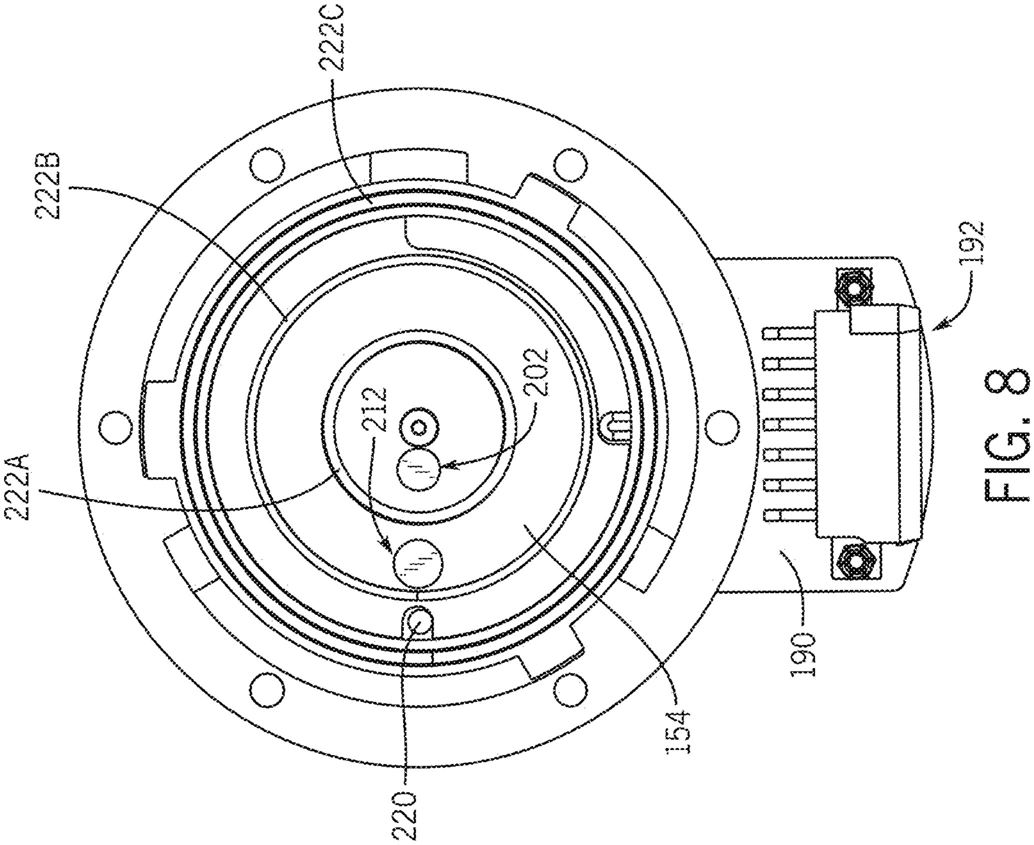
FIG. 8 is a bottom view of the LED assembly of FIG. 7, in accordance with one or more current embodiments.
Figure 7:
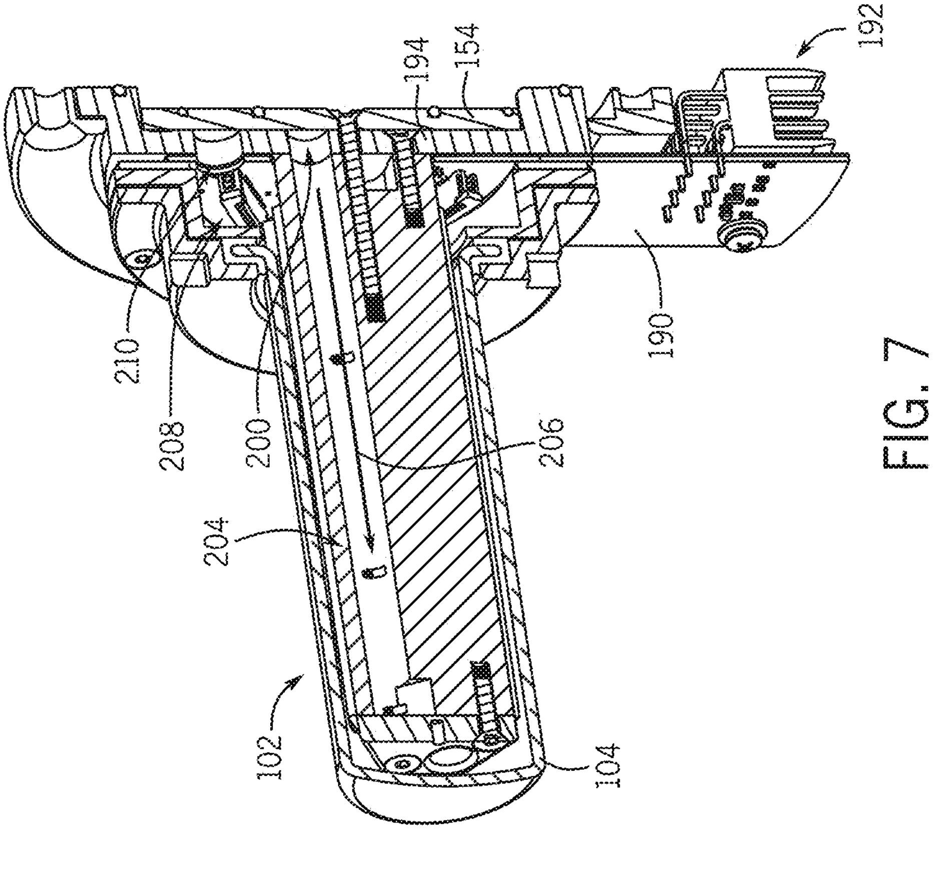
FIG. 7 is a is a perspective cross-sectional view of the LED assembly of FIG. 6 in the closed position, in accordance with one or more current embodiments.

With reference to FIG. 4 and FIG. 5, the LED assembly 102 may include a tab 190, which may include electrical components for the LED assembly 102 such as, but not limited to, sensors and connectors (e.g., multichannel connectors or connections), and printed circuit boards (PCBs). Bearing this in mind, FIG. 7 is a perspective cross-sectional view of the LED assembly 102 in the closed position, and FIG. 8 is a bottom view of LED assembly 102. As illustrated in FIG. 7 and FIG. 8, the tab 190 may include connectors 192, which may be used to communicatively couple the LED assembly 102 to the controller 120 that may be inside of the chassis 134 as well as to provide electrical power to the LED assembly 102. The connectors 192 may include multiple drive channels (e.g., six different drive channels to accommodate varying types of LED tower lamps or LED assemblies) and other electronic connections, such as for thermal sensors to monitor the LED assembly 102. The connectors 192 may also include additional connections (e.g., four pins) to detect what type of LED tower lamp (or LED assembly) is coupled to the controller 120. Indeed, in an embodiment, the controller 120 may detect the LED assembly 102 as being a particular type of LED assembly (e.g., using a look-up table). The controller 120 may determine control drive channels (e.g., six drive channels) used to control the LED assembly 102 based on the detected type of LED assembly in order to control color, zone activation, and/or beam intensity of the LED assembly 102. Thus, the connectors 192 may be connected to inputs or connectors (e.g., via cables or wires) to communicatively couple the LED assembly 102 to the controller 120 to enable the LED assembly 102 to be operated by the controller 120.

Figure 9:
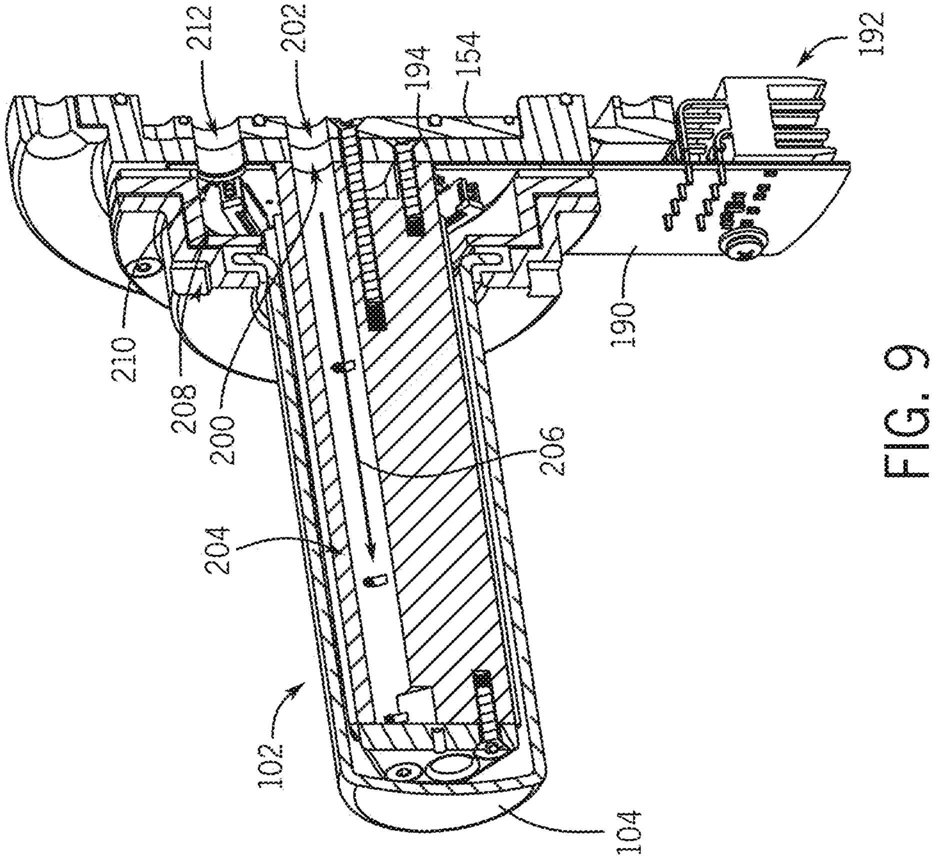
FIG. 9 is a perspective cross-sectional view of the LED assembly of FIG. 6 in the open position, in accordance with one or more current embodiments.

As illustrated in FIG. 7, a middle plate 194 of the LED assembly 102 includes an opening 200 that may serve as an inlet for coolant to enter the LED assembly 102 from the chassis 134 (e.g., as provided by the pump 108) when the valve plate 154 and the valve plate 150 are in the open position or configuration. Indeed, referring to FIG. 7 and FIG. 9, which is a perspective cross-sectional view of the LED assembly 102 in the open position, after coolant enters via the opening 200 (and an opening 202 of the valve plate 154), the coolant may traverse an inner annular passage 204 formed within the LED assembly 102 in a direction 206. The coolant may then enter the enclosure 104 and enter a cavity 208 defined by the enclosure 104 and the valve plate 154. In the cavity 208, which may also be referred to as an "outer annular passage," the coolant may flow over LEDs of the LED assembly 102 to transfer heat generated by the LEDs to the coolant. The coolant may exit the cavity 208 via an opening 210 of the middle plate 194 and an opening 212 of the valve plate 154, which may serve as a coolant outlet. Exiting coolant may reenter the chassis 134 (via the opening 172 of the valve plate 150), return to the pump 108, which may pump the coolant into the heat exchanger 106 before the coolant returns to the LED tower 102 via the opening 170.

Figure 10:
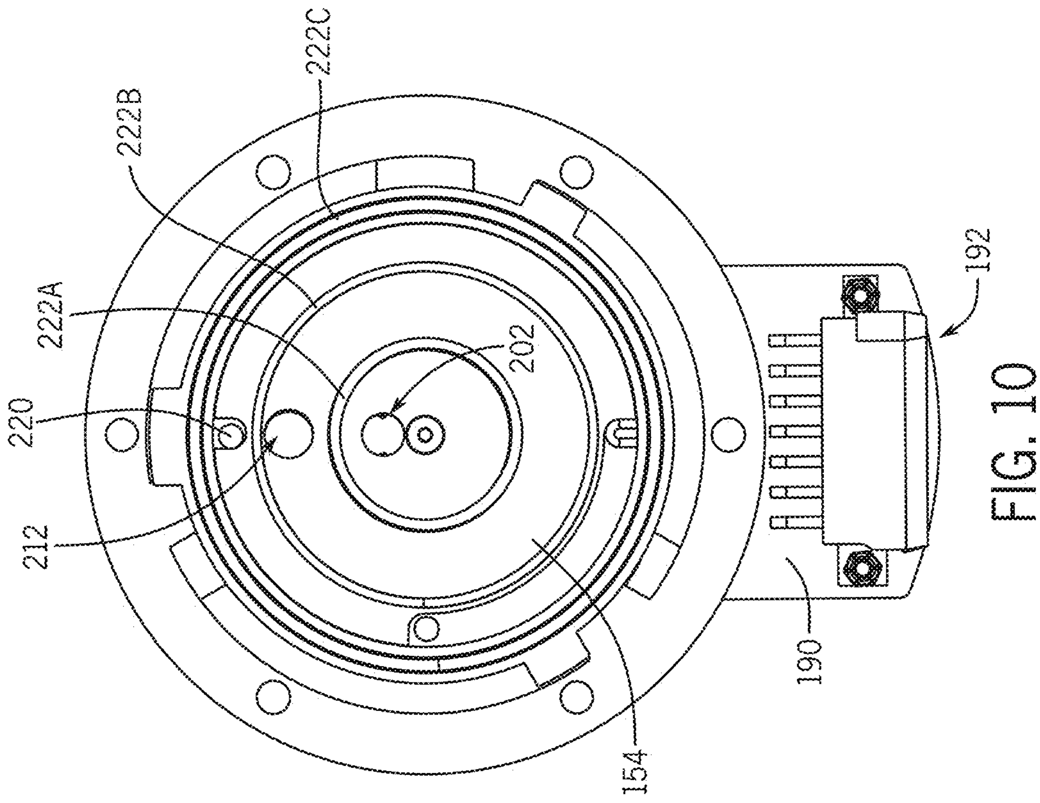
FIG. 10 is a bottom view of the LED assembly of FIG. 9, in accordance with one or more current embodiments.

Returning briefly to FIG. 8, switching between the open and closed positions will be discussed in more detail. The valve plate 154 may include a protrusion 220 that may fit into the groove 174 of the valve plate 150. When the LED assembly 102 is rotated (e.g., by a user or technician rotating the LED assembly 102), the valve plate 150 may be rotated due to the rotation of the LED assembly 102 (or, more specifically, the valve plate 154), thereby respectively aligning opening 202 and opening 212 of the valve plate 154 with the opening 170 and the opening 172 of the valve plate 150. Indeed, as can be seen comparing FIG. 8 to FIG. 10 (which is a bottom view of the LED assembly 102 in the open position), when the valve plate 154 is in the closed position, the valve plate 154 and the middle plate 194 are not aligned to allow coolant to flow into the inner annular passage 204 of the LED assembly 102. Conversely, when the valve plate 154 is in the open position, the valve plate 154 and the middle plate 194 are aligned, thereby enabling coolant to flow into the LED assembly 102.

The LED assembly may also include gaskets 222 (referring collectively to gasket 222A, gasket 222B, and gasket 222C), which may prevent leakage of coolant. The gaskets 222 may be O-rings or any other suitable type of gasket or seal.

Figure 11:
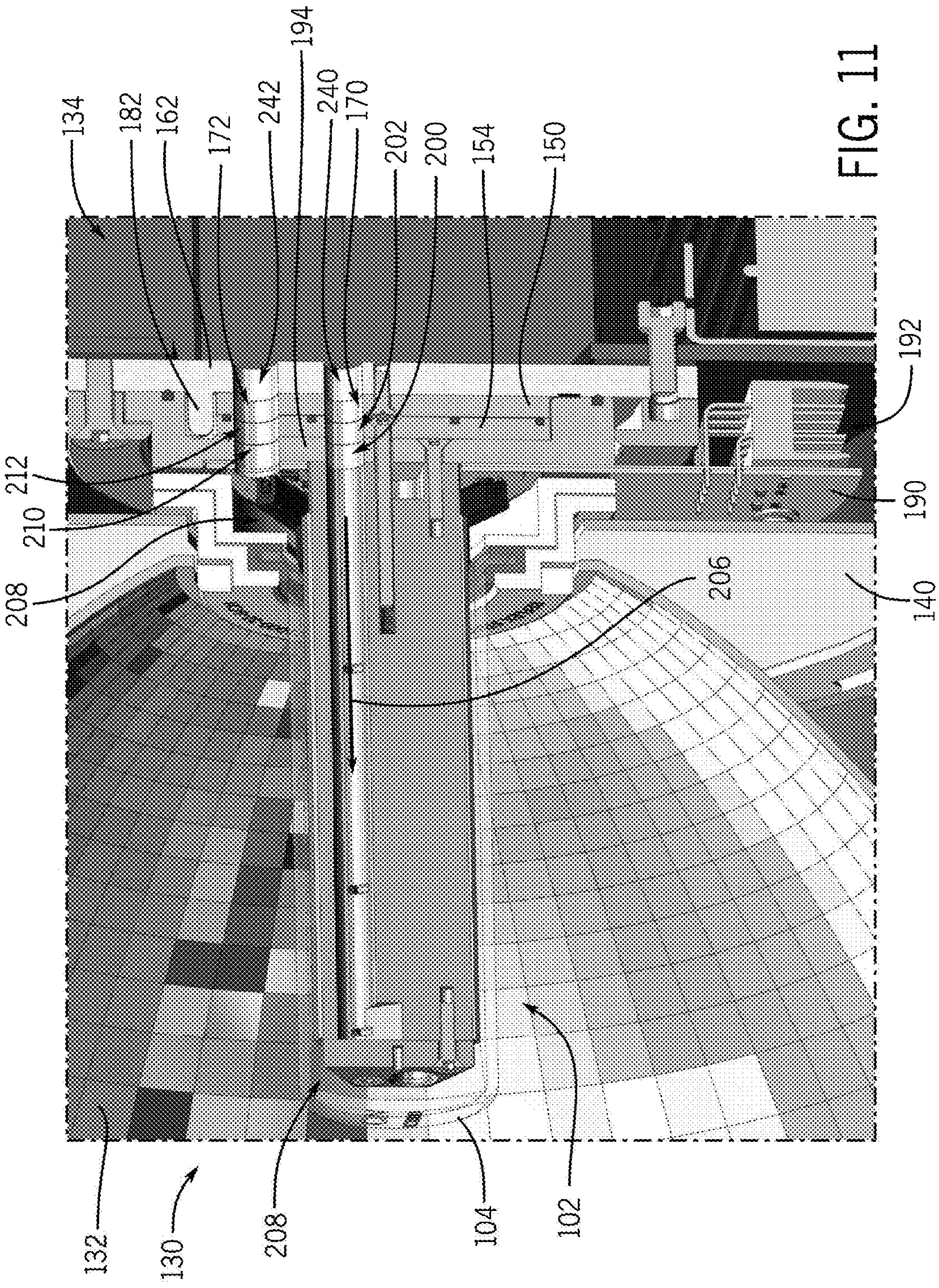
FIG. 11 is a side cross-sectional view of a portion of the lighting assembly of FIG. 2, in accordance with one or more current embodiments.

Keeping the discussion of the open position in mind, FIG. 11 is a side perspective cross-sectional view of the lighting assembly 130. In FIG. 11, the valve plate 154 and the valve plate 150 are in the open position. Accordingly, the opening 170, the opening 200, and the opening 202 are aligned with an opening 240 (e.g., inlet) of the base plate 168, which may be fluidly coupled to cooling system 100. Thus, coolant may be pumped into the LED assembly 102 via the opening 240. Additionally, the opening 210, the opening 212, and the opening 172 are aligned with an opening 242 (e.g., outlet) of the base plate 168. The coolant may return from the LED assembly 102 into the chassis 134 via the opening 242.

As such, the valve plate 150 and the valve plate 154 may be utilized to prevent coolant from leaking or otherwise escaping from the chassis 134 and the LED assembly 102. As such, the lighting assembly 130 may be used with several different types of LED assemblies and reflectors (or other lighting accessories), and the repair, maintenance, and replacement of such components may be made independent of the components of the cooling system 100 of the chassis 134 and without coolant leaking from the chassis 134 (or the LED assembly 102).

Figure 12:
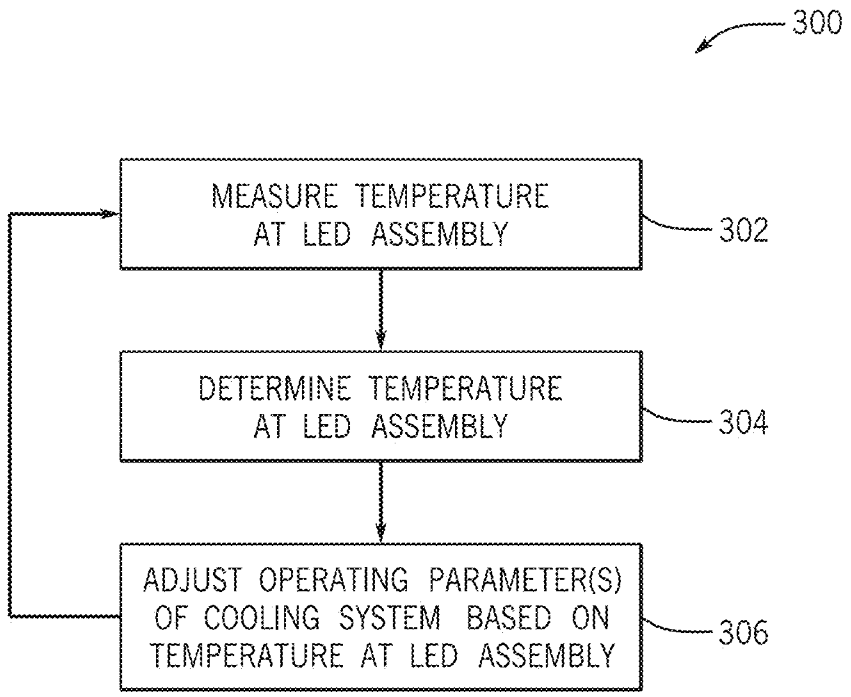
FIG. 12 is a flow diagram of a process for controlling the cooling system of FIG. 1, in accordance with one or more current embodiments.

FIG. 12 is a flow diagram of a process 300 for controlling the cooling system 100. For example, the process 300, or portions thereof, may be performed by the controller 120 of the cooling system 100. The process 300 begins at block 302, where the temperature at an LED assembly (e.g., the LED assembly 102) is measured. The sensor 121 may measure the temperature and output a signal (e.g., an input signal to the controller 120) indicative of the temperature at or adjacent to the LED assembly (e.g., a temperature at a surface of the LED assembly, a temperature of the fluid adjacent to and/or flowing over the LED assembly, a temperature at a surface of the enclosure 104, etc.). The controller 120 may receive the signal indicative of the temperature.

At block 304, the temperature at the LED assembly is determined. Block 304 may be performed in addition to or in place of block 302. For example, block 302 may be omitted from the process 300, and the sensor 121 may be omitted from the cooling system 100. The controller 120 may be configured to determine the temperature at the LED assembly based on whether the LED assembly, or portions thereof, are emitting light and based on an amount of time that the LED assembly, or the portions thereof, have been emitting light. As generally described above, the controller 120 may be configured to control the LED assembly 102 (e.g., by controlling which LED arrays of the LED assembly 102 are emitting light, a duration that the LED arrays emit light, an intensity of the light emitted by the LED arrays, etc.). Based on the control actions, the controller 120 may determine/estimate the temperature at the LED assembly (e.g., the temperature at the surface of the LED assembly 102, the temperature of the fluid adjacent to and/or flowing over the LED assembly 102, the temperature at the surface of the enclosure 104, etc.).

At block 306, operating parameter(s) of the cooling system 100 are adjusted based on the temperature at the LED assembly (e.g., the temperature measured at block 302 and/or determined at block 304). For example, the controller 120 may output a signal (e.g., an output signal) to the pump 108 indicative of instructions to adjust the flowrate of fluid through the cooling circuit 110. Additionally or alternatively, the controller 120 may output a signal to a heat exchanger (e.g., the heat exchanger 106) indicative of instructions to adjust a flow rate of air flowing over a radiator of the heat exchanger (e.g., by outputting a signal to fans of the heat exchanger 106 indicative of instructions to adjust a rotational speed of the fans to adjust the flow rate of air). In certain embodiments, the controller 120 may control the LED assembly based on the temperature at the LED assembly 102, such as by reducing a number of LED arrays emitting light and/or to prevent overheating of the LED assembly 102.

In certain embodiments, the controller 120 may compare the temperature at the LED assembly 102 to a target temperature and determine whether a difference between the temperature (e.g., a measured and/or determined temperature at the LED assembly 102) and the target temperature is greater than a threshold value. Based on the difference exceeding the threshold value, the controller 120 may control the operating parameters of the cooling system 100 described above. As such, the controller 120 may reduce certain control actions performed by the cooling system 100 based on minor temperature fluctuations and/or may reduce an amount of air flow and/or power used by the heat exchanger to cool the fluid. The controller 120 may receive an input indicative of the target temperature (e.g., from an operator of the cooling system 100) and/or may determine the target temperature based on a type of LED included in the LED assembly 102, a type of fluid circulating through the cooling system 100, a material of the enclosure, a material of the tower of the LED assembly 102, a size of the LED assembly 102 and/or the cooling system 100 generally, or a combination thereof.

After completing block 306, the process 300 returns to block 302 and the next temperature at the LED assembly is measured. Alternatively, the process 300 may return to block 304, and the next temperature at the LED assembly may be determined. As such, blocks 302-306 of the process 300 may be iteratively performed by the controller 120 and/or by the cooling system 100 generally to facilitate cooling of the LED assembly and the enclosure.

As noted above, a limiting factor in LED fixture design is the size and number of LEDs required. For example, designs for Correlated Color Temperature (CCT) tunable white light LED fixtures may use two color channels (e.g., a 2700K channel (for warm white) and a 6500K channel (for cool white)). The various blending (e.g., ratios) between these two color channels make up the range of CCTs available to be produced by the fixture. However, at each end of the CCT range, it may be the case that only half of the total LEDs of the fixture are used. For example, for 2700K light, one half of the LEDs may emit light, while the other half of the LEDs do not emit light. At CCTs that are more typically used for production (e.g., 3200K and 5600K) all of one channel (e.g., half of the total LEDs of the fixture) may be used, while a small portion of the other channel is used for tuning. Indeed, all of the LEDs may not be utilized unless the CCT values that are approximately in the center of the range (e.g., approximately 4300K), which may occur when all of the LEDs of both the 2700K channel and the 6500K are used. As such, current design limits overall power output of the LED fixture at desired CCTs for production (e.g., approximately 3200K and 5600K).

Furthermore, to increase the power output of the current designs using the techniques described in the preceding paragraph, the total amount of LEDs would be increased, which would in turn increase the overall size of the LED lamp. However, if the size of the light source (LED lamp) were increased, the optics (e.g., lenses) utilized with the light source would be scaled the same amount to keep the same beam control. For example, using double the number of LEDs for 2700K to 6500K white color control would double the size of the LED lamp, which would result in a fixture (e.g., housing) and optics that also would be twice as large.

As described below, to enable increased overall power output (e.g., more light), the controller 120 may utilize additive lighting (e.g., using multiple channels), and the LED assembly 102 may utilize particular amounts of LEDs controlled by each channel. In other words, rather than utilizing a larger fixture or optics (e.g., reflector 132), the controller 120 may control the LED assembly 102 to provide enhanced (e.g., relatively brighter or higher intensity) lighting. Furthermore, while the techniques described below are discussed with respect to white lighting, these techniques are not limited to white lighting and may be used with other LEDs that provide, for example, red, blue, green or other color lighting.

Figure 13:
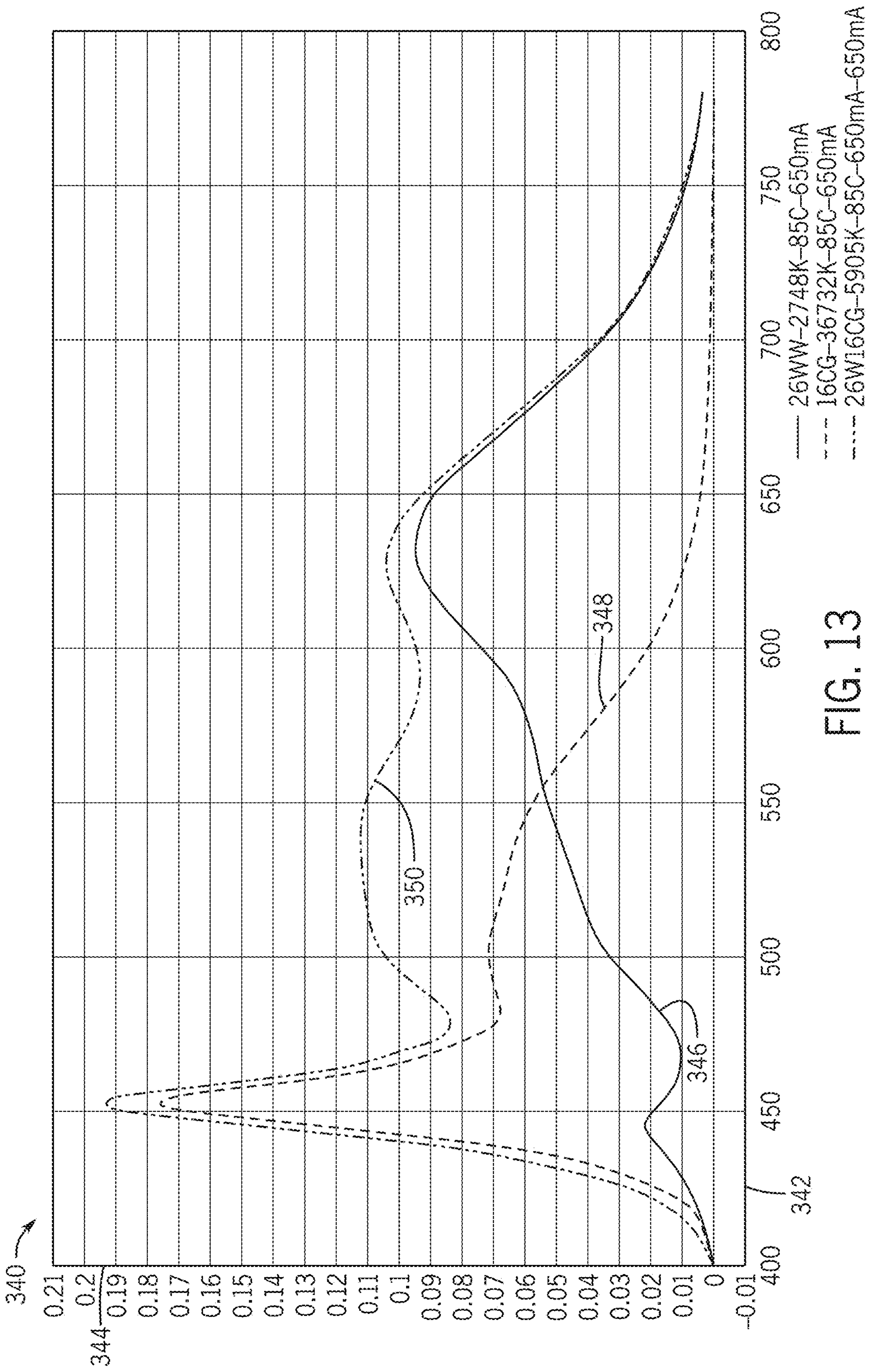
FIG. 13 is a graph indicating intensities of light emitted by the LED assembly of FIG. 1 at particular wavelengths of visible light, in accordance with one or more current embodiments.

To help explain how the controller 120 may cause additive lighting techniques to be used to enhance cause the lighting assembly 130 to provide a desired CCT at an enhanced brightness, FIG. 13 is provided. In particular, FIG. 13 is a graph 340 plotting wavelength in nanometers (as indicated by axis 342) versus intensity (as indicated by axis 344). As such, the graph 340 is indicative of how bright various whites produced by the lighting assembly 130 may be relative to one another. The wavelengths indicated by the axis 342 correspond to colors of visible light. For example, on the graph, the further to the left of the axis 342, the warmer the white (e.g., red). The further to the right along the axis 342, the cooler the white (e.g., purple).

The controller 120 may utilize two CCT channels. For example, a first color channel (e.g., a first CCT channel) may be a warm white base CCT (e.g., the 2700K channel described above), which is indicated by line 346 of the graph 340. The warm white base may always be utilized when the LED assembly 102 emits light. In other words, controller 120 may cause the warm white base channel to be set to 100% such that the LEDs that can emit light in accordance with the line 346 emit light. In one embodiment, this may be approximately (e.g., ±5%) 65% of the total LEDs included in the LED assembly 102. A second CCT channel (e.g., an additive white channel) utilized by the controller 120 may be utilized to control a remaining portion of the LEDs in the LED assembly 102 (e.g., approximately 35% of the LEDs of the LED assembly 102) that emit light in accordance with line 348. Such LEDs may emit light in a particular spectrum. For example, the second CCT channel may control LEDs that emit blue/green light. As such, the controller 120 may adjust the light output by the LED assembly 102 to reach a desired temperature by using the second CCT channel to add light to the base white light emitted by LEDs controlled using the first CCT channel. Such an output is represented by line 350 in the graph 340. As such, the LEDs controlled by the second CCT channel may be utilized in an additive manner generate cooler whites than the base white (e.g., 2700K) of the LEDs controlled by the first CCT channel.

As a result, the LEDs controlled by the first and second CCT channels are fully utilized (e.g., at 100% usage) or nearly fully utilized (e.g., 100% usage for the first CCT channel and 95%±5% usage for the second CCT channel) when emitting 5600K light that is often used for film and television. Using these techniques, at 5600K, the intensity of light generated by the LED assembly 102 is approximately double the output compared to using a 2700K channel and a 5600K channel as described above. Furthermore because approximately 65% of the LEDs of the LED assembly 102 can be utilized to emit 2700K light, the LED assembly 102 may also emit more light compared to previous techniques described above (e.g., in which 50% of LEDs are controlled by a 2700 channel.) Accordingly, by utilizing the presently disclosed techniques, the majority of the LEDs of the LED assembly 102 are used (for any desired output (e.g., CCT)), thereby enabling the LED assembly 102 to emit more light. As such, an LED lamp (e.g., lighting assembly 130 using the LED assembly 102 can have a full tunable range from 2700K to 6500K with greater (e.g., approximately 1.8 times) output compared to previous techniques described above at 5600K. As noted above, this is particularly useful for film and television production in which CCTs of 3200K, 4300K, and 5600K are commonly used. Furthermore, the compact size of the LED source (e.g., LED assembly 102) also allows for more compact fixtures with better beam control at improved power densities.

Figure 14:
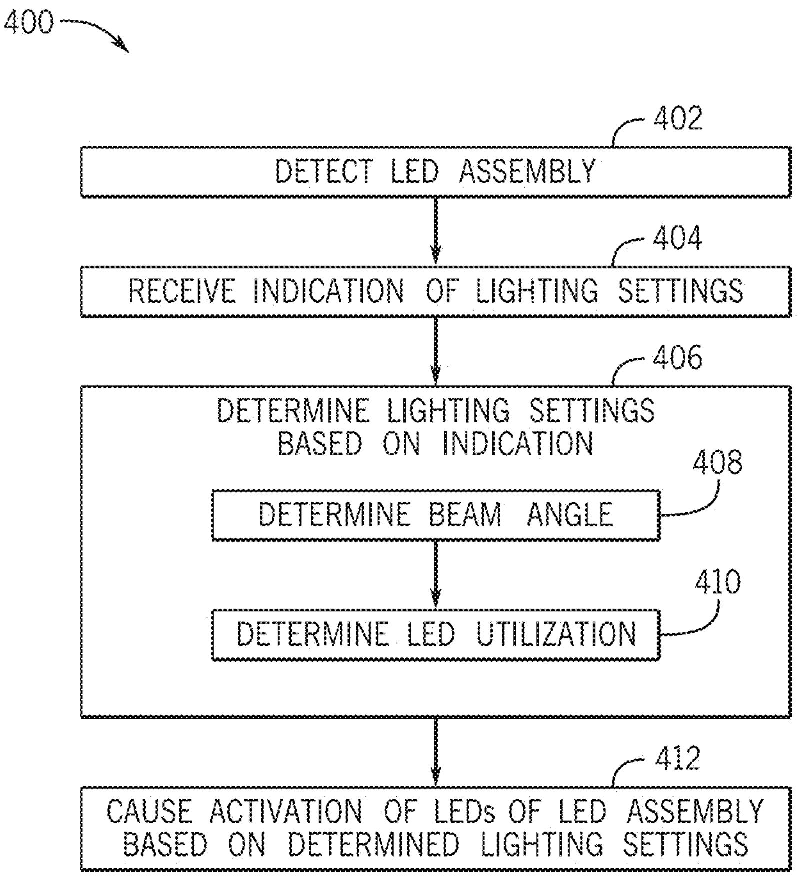
FIG. 14 is a flow diagram of an embodiment of a method for controlling the light emitted by the LED assembly of FIGS. 1-11, in accordance with one or more current embodiments.

FIG. 14 is a flow diagram of a process 400 for controlling the lighting assembly 130, or, more specifically, the LED assembly 102. The process 400, or portions thereof, may be performed by the controller 120, for example, by the processor 122 executing instructions stored on a non-transitory computer-readable medium, such as the memory device 124.

At process block 402, the controller 120 may detect the LED assembly 102. More specifically, the controller 120 may detect that the LED assembly 102 has been communicatively coupled to the controller 120, for example, via the connectors 192. Additionally, the controller 120 may determine a type of the LED assembly 102, which may be a model of the LED assembly 102 and/or LEDs included in the LED assembly 102. For example, the type of the LED assembly 102 may be the types and amounts of LED panels included on a tower inside the LED assembly 102. The type of the LED assembly 102 as detected by the controller 120 may determine the available lighting settings available to a user via the controller 120.

At process block 404, the controller 120 may receive an indication of the lighting settings requested by a user. The indication of lighting may be (or be indicative of) a beam angle and/or temperature of light (e.g., a value of a CCT) to be emitted by the LED assembly 102, for example, as requested by a user input made via the user interface 126 or another device communicatively coupled to the controller 120. In some embodiments, the received indication may also indicate or be indicative of a type of reflector 132 (e.g., parabolic, ellipsoidal, Fresnel).

At process block 406, the controller 120 may determine lighting settings based on the indication received at process block 404. In particular, at sub-process block 408, the controller may determine a beam angle, which may be the beam angle provided by the received indication. Additionally, at sub-process block 410, the controller 120 may determine which LEDs of the LED assembly 102 to be utilized to emit light. More specifically, the controller may perform sub-process blocks 408, 410 by accessing a look-up table that may be stored in the memory device 124 that is indicative of beam angles and lighting utilizations for different requested beam angles and/or temperature (e.g., CCT). For example, when 2700K white light is requested (e.g., as indicated in the indication received at process block 404), the controller 120 may determine that a first portion of the LEDs that emit 2700K white light are to be utilized. When another white light is requested, such as 5600K white light or another CCT that is greater in value than 2700K, the controller 120 may determine (e.g., using a look-up table) another portion of the LEDs of the LED assembly 102 that are to be used in addition to those used to provide 2700K white light. Furthermore, in embodiments in which the indicated received at process block 404 is indicative of the type of the reflector 132, the controller 120 may also determine the lighting settings based on the type of the reflector 132. For instance, in embodiments in which the controller 120 utilized a look-up table to determine the lighting settings, the look-up table may include beam angles and or LED utilizations that are specific to one or more types of reflectors. It should also be noted that the memory 124 may include several look-up tables, and each of the look-up tables may be specific to a particular type of the LED assembly 102. As such, the controller 120 may select which look-up table to access based on the type of the LED assembly 102.

At process block 412, the controller 120 causes activation of the LEDs of the LED assembly 102 based on the lighting settings determined at process block 406. In other words, upon determining how the LED assembly 102 is to emit light, the controller 120 may cause the LED assembly 102 to emit light in the determined manner.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A lighting assembly comprising:
a chassis; and
an interface configured to:
allow fluid to pass through the chassis to a light emitting diode (LED) assembly when the LED assembly is installed at the interface; and
prevent the fluid from exiting the chassis when the LED assembly is not installed at the interface, wherein the interface comprises a first valve plate configured to be engaged by a second valve plate of the LED assembly and rotated by the second valve plate from a first position to a second position to allow the fluid to pass through the chassis, wherein the first valve plate comprises a first inlet and a first outlet.

2. The lighting assembly of claim 1, wherein the first valve plate comprises a groove configured to engage a protrusion of the LED assembly such that rotation of the LED assembly causes the first valve plate to change from the first position to the second position.

3. The lighting assembly of claim 2, wherein:
the second valve plate comprises the protrusion; and
the first valve plate comprises a first opening that aligns with a second opening of the second valve plate when the LED assembly is installed in the interface.

4. The lighting assembly of claim 3, wherein:
the interface comprises a base plate comprising an outlet of the fluid; and
when the LED assembly is installed:
the first valve plate is disposed between the LED assembly and the base plate; and
the outlet is aligned with the first opening and the second opening.

5. The lighting assembly of claim 1, wherein:
the interface comprises an outer ring having a plurality of slots configured to receive a plurality of tabs of the LED assembly when the LED assembly has a first orientation in the interface; and
when the LED assembly has a second orientation, the outer ring is configured to prevent removal of the of the LED assembly from the interface until the LED assembly is returned to the first orientation.

6. The lighting assembly of claim 1, wherein:
the LED assembly comprises a tower and a plurality of LED arrays disposed along the tower; and
the fluid comprises a coolant, a mineral oil, water, a hydrocarbon fluid, a silicon fluid, or a combination thereof.

7. The lighting assembly of claim 1, comprising a controller configured to be communicatively coupled to the LED assembly, wherein the controller is configured to:
cause a first portion of a plurality of LEDs of the LED assembly to be activated to provide a base white light;
determine an additive white from a second portion of the plurality of LEDs of the LED assembly that will result in a target white light; and
cause the second portion of the plurality of LEDs of the LED assembly to be activated to provide the additive white.

8. The lighting assembly of claim 1, wherein the second valve plate comprises a second inlet and a second outlet.

9. A lighting assembly comprising:
a light emitting diode (LED) assembly comprising a first valve plate and a plurality of LEDs, wherein the first valve plate comprises a first inlet and a first outlet; and
a chassis comprising:
a controller communicatively coupled to the LED assembly and configured to control emission of light by the plurality of LEDs; and
an interface comprising a second valve plate configured to be engaged by the first valve plate and rotated by the first valve plate from a first position to a second position to allow fluid to pass through the chassis, wherein the second valve plate comprises a second inlet and a second outlet, wherein the interface is configured to:
allow the fluid to pass through the chassis to the LED assembly when the LED assembly is installed at the interface; and
prevent the fluid from exiting the chassis when the LED assembly is not installed at the interface.

10. The lighting assembly of claim 9, wherein the LED assembly comprises a third plate comprising a third inlet and a third outlet, wherein, when the LED assembly is installed, the second valve plate is disposed between the first valve plate and the third plate.

11. The lighting assembly of claim 10, wherein the second valve plate is configured to be rotated from a third position from a fourth position to align:
the second inlet with the first inlet and the third inlet to allow the fluid to enter the LED assembly from the chassis; and the second outlet with the first outlet and the third outlet to enable the fluid to enter the chassis from the LED assembly.

12. The lighting assembly of claim 11, wherein:

the fluid comprises a coolant, a mineral oil, water, a hydrocarbon fluid, a silicon fluid, or a combination thereof;

the lighting assembly comprises a pump configured to pump the fluid; and the interface comprises:

a fourth inlet configured to receive the fluid from the pump; and a fourth outlet configured to allow the fluid exiting the LED assembly to return to the pump.

13. The lighting assembly of claim 11, wherein a base plate of the interface and the third plate remain in place when the first valve plate and the second valve plate are rotated.

14. A lighting assembly comprising:

a light emitting diode (LED) assembly comprising a plurality of LEDs; and a chassis comprising:

a controller communicatively coupled to the LED assembly and configured to:

determine a type of the LED assembly; and control emission of light by the plurality of LEDs based on the type of the LED assembly; and an interface that comprises a valve plate having an inlet, wherein the valve plate is configured to:

when in a first position, prevent fluid from exiting the chassis;

when in a second position, allow the fluid to exit the chassis; and be rotated in a first direction to modify the valve plate from being in the first position to being in the second position.

15. The lighting assembly of claim 14, wherein the interface comprises a protrusion that prevents rotation of the valve plate a second direction that is opposite to the first direction when the valve plate is in the first position.

16. The lighting assembly of claim 14, wherein the controller is configured to cause a first portion of the plurality of LEDs of the LED assembly to be activated to provide a base white light.

17. The lighting assembly of claim 16, wherein:

the first portion of the plurality of LEDs comprises more than half of the plurality of LEDs; and the controller is configured to cause the LED assembly to emit white light other than the base white light by causing a second portion of the plurality of LEDs that is different than the first portion of the plurality of LEDs to emit light while the first portion of the plurality of LEDs emits light.

18. The lighting assembly of claim 17, wherein the controller is configured to control:

the first portion of the plurality of LEDs via a first channel; and the second portion of the plurality of LEDs via a second channel.

19. A light-emitting diode (LED) assembly, comprising:

a plurality of LEDs;

an enclosure at least partially enclosing the plurality of LEDs within the LED assembly; and a valve plate comprising:

an inlet configured to receive a fluid; and an outlet configured to allow the fluid to exit the LED assembly, wherein:

the valve plate is configured to rotate between a first position and a second position relative to a chassis of a lighting assembly;

in the first position, the fluid is prevented from flowing from the LED assembly into the chassis; and in the second position, the fluid is allowed to flow from the LED assembly into the chassis.

20. The LED assembly of claim 19, wherein the LED assembly is configured to couple to an interface of a lighting assembly to enable the fluid to flow between the LED assembly and the chassis of the lighting assembly.

21. The LED assembly of claim 19, wherein:

the LED assembly is configured to couple to a controller; and the LED assembly comprises memory that enables the controller to determine a type of the LED assembly, one or more communication channels of the LED assembly, or both the type of the LED assembly and the one or more communication channels.

22. The LED assembly of claim 19, wherein the LED assembly is configured to be inserted into an interface of the chassis of the lighting assembly.

23. The LED assembly of claim 22, when inserted into the interface, the LED assembly is configured to be rotated to cause the valve plate to rotate between the first position and the second position.

* * * * *